April 15, 1924.
D. BARUTH
CHICK FEEDER
Filed June 23, 1923
1,490,757
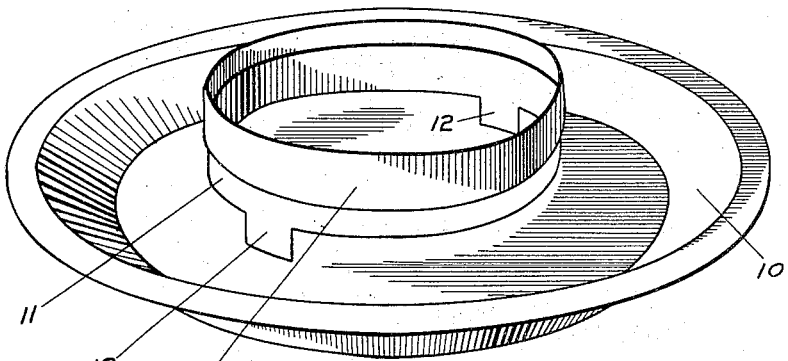
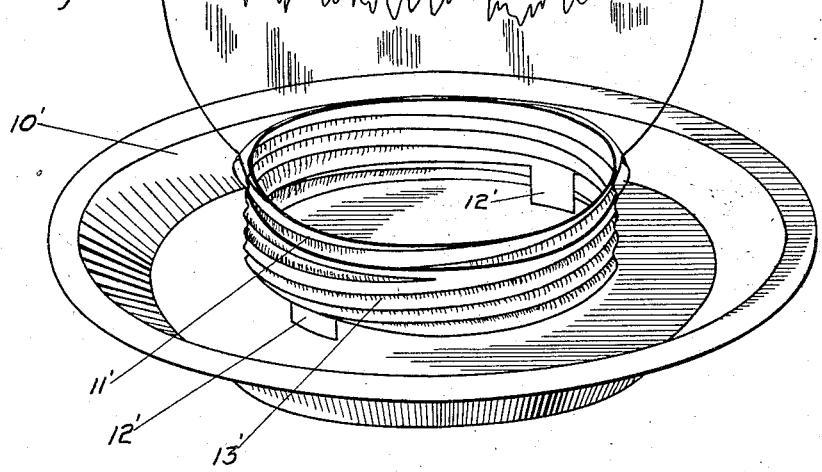
DEWEY BARUTH, INVENTOR.
BY Emil F. Lange ATTORNEY Patented Apr. 15, 1924.

1,490,757

UNITED STATES PATENT OFFICE.

DEWEY BARUTH, OF ALEXANDRIA, NEBRASKA, ASSIGNOR OF ONE-HALF TO FRED A. JACQUES, JR., OF ALEXANDRIA, NEBRASKA.

CHICK FEEDER.

Application filed June 23, 1923. Serial No. 647,309.

*To all whom it may concern:*

Be it known that I, DEWEY BARUTH, a citizen of the United States, residing at Alexandria, in the county of Thayer and State of Nebraska, have invented certain new and useful Improvements in Chick Feeders, of which the following is a specification.

My invention relates to chick feeders and waterers of the type utilizing a Mason jar or similar container, and wherein the food or water is made available to the poultry in quantities only to replace that consumed.

I am aware that devices for this purpose have been known to the public for a number of years, but all prior devices of this kind have two serious defects. In turning them over into feeding position, there is more or less spilling of the contents of the jar, this spilling being annoying at all times and wasteful when liquids like milk are being fed. The prior devices are adapted only for supplying liquids to the birds, but poultrymen are demanding a feeder which will function with semi-fluent foods like sour milk as well as they function with water and liquid foods. The object of my invention is the provision of a device which possesses all of the merits of similar devices heretofore known, and which at the same time will be free from all of the defects of the prior devices of the kind.

Having in view this and other objects which will appear in the description, I will now refer to the drawings, in which—

Figure 1 is a view in perspective of one form of my device, and

Figure 2 is a similar view of a modification, showing also a broken-away portion of the Mason jar.

My feeder includes a tray or dish 10 of suitable depth, and means for supporting the container for the foods with its mouth spaced from the bottom of the dish. The novelty of my invention resides in the supporting means.

In the form shown in Figure 1, I employ a simple metallic band 11 having a plurality of legs 12, with a slidable band 13 surrounding the band 11. While the form and dimensions of these parts may be varied between wide limits, there are certain governing factors to restrict the choice. The band 11 should be just large enough in diameter to permit it to be slipped over the neck of the container. The width of the band 11 should be substantially equal to the length of the neck portion of the container, so that the shoulder of the container will rest on the upper edge of the band. The legs 12 have their feet soldered, welded, riveted, or otherwise secured to the bottom of the dish 10. While I do not desire to restrict myself to any particular number of legs, I prefer to use two only, so as to obtain an unobstructed passage for thick foods like sour milk. The band 13 should be slidable but not loose on the band 11, and it should be wide enough to completely close the openings between the legs 12.

In use the container of the food is held upright and the device is placed in position with the band 11 encircling the neck of the container. Before inverting, the band 13 should be slipped into a position for closing the openings. The device with the container are then inverted, after which the ring or band 13 is slipped upward to release the contents. It should be here noted that this arrangement permits adjustment of the size of the openings.

While the form shown in Figure 1 is my preferred form, it is often desirable, especially when using a Mason jar or other container having a screw-threaded neck, to secure the device to the container to prevent accidental displacement and the spilling of the contents in the poultry yard. In the form shown in Figure 2, the parts 10′, 11′, 12′, and 13′ occupy the same relative positions as the corresponding parts of the form shown in Figure 1, but whereas the ring bands 11 and 13 are smooth, the ring bands 11′ and 13′ are screw threaded. In use, the threaded ring band 11′ receives the neck of the Mason jar and holds it securely in place. The ring band 13′ is correspondingly threaded and can be raised and lowered by turning it on the band 11′.

My device will function on any kind of tray or dish 10, and I do not desire to restrict myself to any specific form of dish. If however, the chicks are given the opportunity, they are apt to step into the dish or onto the edges of the dish and to foul the contents. This is likely to be especially serious when feeding germ-breeding foods like milk, and in practice I have found it desirable to so design the device with reference to the container that the chicks will find it impossible to get their feet either into the dish or onto its edges.

Having thus described my invention in terms which will be readily understood by others skilled in the art to which it pertains, what I believe to be new and desire to secure by Letters Patent of the United States is:—

1. A chick feeding and watering attachment for jars, comprising a dish, a ring adapted to fit about the neck of a jar and having legs at its inner edge connected to the bottom of the dish for spacing the ring therefrom, said dish and ring being adapted to be over-turned upon the mouth of the jar and the ring fitted about the neck of the jar, and a second ring adjustable over the first ring and said legs, said second ring being adapted to be moved inwardly against the dish when the latter is inverted for closing the space between the first ring and the dish while the jar is inverted, the second ring being adapted to be raised on the first ring to control the outflow of the contents of the jar into the dish.

2. A chick feeder and waterer comprising a flat dish, a pair of superposed rings arranged in telescoping relation within the dish, the dish and rings being adapted to be overturned upon a commercial jar and the inner ring being of sufficient diameter to receive therein the neck of the jar and being of a depth sufficient to engage the jar and support it in spaced relation from the bottom of the dish, said inner ring also having inwardly extending legs projecting from the lower edge of the inner ring and engaging the dish to space the inner ring above the bottom of the dish and permit passage of the contents outwardly into the dish from the jar, the outer ring being adapted to be slid over the inner ring and over the legs for closing the outlet spaces during the overturning of the jar and adapted to be adjusted for regulating the out-flow of the contents of the jar through said outlet spaces.

In testimony whereof I affix my signature.

DEWEY BARUTH.